July 27, 1926.
O. G. WELLTON
1,593,682
STEERING GEAR FOR MOTOR CARS, TRACTORS, AND THE LIKE
Filed Dec. 5, 1925
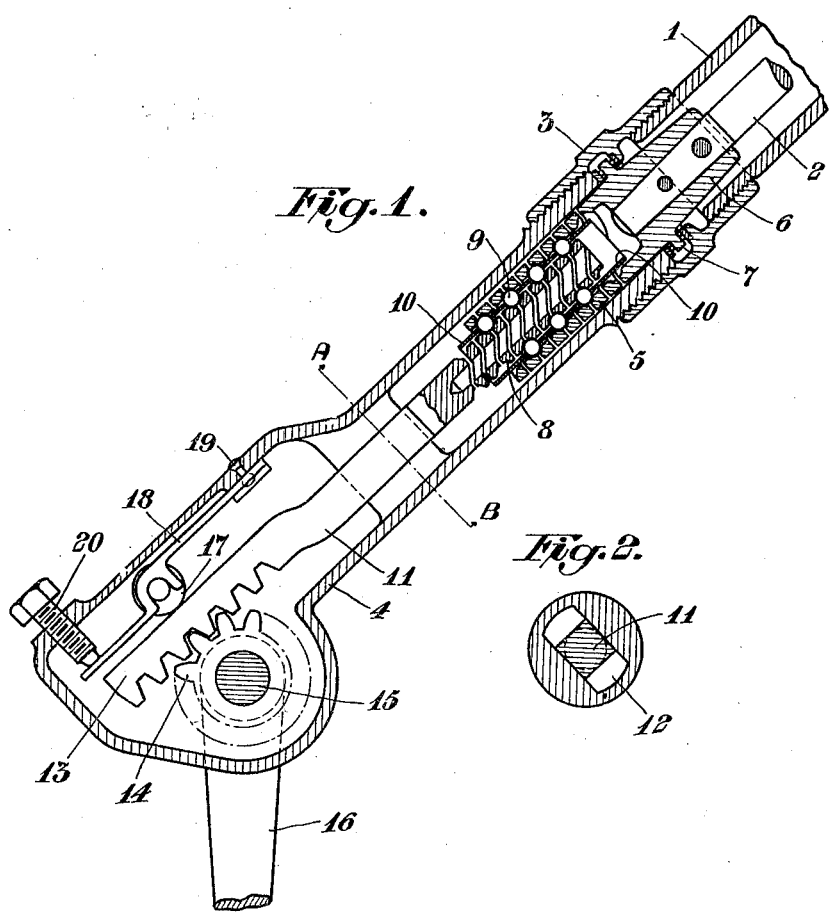
*Inventor:*
OTTO GOTTFRIED WELLTON
By George Bayard Jones *atty.*

Patented July 27, 1926.

1,593,682

UNITED STATES PATENT OFFICE.

OTTO GOTTFRIED WELLTON, OF TROLLHATTAN, SWEDEN.

STEERING GEAR FOR MOTOR CARS, TRACTORS, AND THE LIKE.

Application filed December 5, 1925, Serial No. 73,445, and in Sweden November 22, 1924.

The present invention relates to a steering gear for motor cars, tractors, and the like, in which for transmitting movement from the hand or steering wheel, or the steering member otherwise used, to the front wheel or wheels there is inserted a screw gearing between said parts. Steering gears of this type as heretofore used, in which the screw gearing consists in the usual manner of a worm and worm wheel, possess the disadvantage that when used and worn for some time said gearing begins to work loose. This produces a many times magnified play or lost motion at the periphery of the hand wheel, which renders the steering considerably more difficult, and which has caused accidents on many occasions.

The invention has for its purpose to avoid this disadvantage, and consists principally in that the screw gearing comprises, instead of worm and worm wheel, a nut and a screw engaging the same, at least one of said two parts consisting of a helical spring which, when it engages the other part, is held under tension in such manner that it prevents lost motion between the two parts. It is suitable to make the screw as well as the nut of helical springs. In order to decrease the frictional resistance during the steering it is further advantageous to place balls between the screw and the nut which balls effect the engagement between said two parts.

An embodiment of the invention is illustrated in the accompanying drawing by way of example. Fig. 1 shows a longitudinal section of a steering gear according to the invention, and Fig. 2 shows a transverse section on the line A—B in Fig. 1.

In the embodiment illustrated, 1 denotes the usual steering tube which at its upper end supports the hand wheel not shown in the drawing and which is secured to a shaft 2 which will thus be turned when the hand weel is turned. The steering tube 1 is rigidly connected by means of a socket 3 with the casing 4 which encloses the gearing. Said gearing consists in the embodiment illustrated of a screw gearing and of a toothed gearing. The screw gearing consists of a double helical spring 5 which serves as a nut and the upper end of which is rigidly connected to or made integral with a sleeve 6, which in its turn is secured to the shaft 2 and has a flange 7 which engages between an interior flange in the socket 3 and the upper end of the casing 4, in such manner that the sleeve 6 is rotatable but not slidable axially with relation to the casing 4, and of a double helical spring 8 which serves as a screw, and which has a smaller diameter than but the same pitch as the spring 5 and extends through said spring, and is in engagement with said spring 5 through the intermediary of balls 9 placed between said two springs. Between the two helical springs which, as shown in Fig. 1, have such cross-sectional profile that they form races for the balls, a ball retainer is placed which consists of a tube 10 having a thin wall in which oblong apertures for the balls 9 are provided, so that said balls will thus obtain the necessary guidance. The inner helical spring 8 is secured at its lower end to a bar 11 having a square portion which passes through a constricted portion 12 of the casing 4, see Fig. 2, in such manner that said bar may slide in its longitudinal direction but is unable to rotate in the casing. When turning the hand wheel and thus the shaft 2 the bar 11 will thus slide upwards or downwards, depending upon the direction of turning.

Both helical springs 5 and 8 should be made in such manner that a certain initial tension is set up when the balls 9 are screwed in between the same. In this manner lost motion is positively prevented also when the gear has become somewhat worn after use during a long time. Owing to the balls being placed between the screw and the nut, however, the wear will be very small. In order to obtain as even a load as possible on all balls 9, the helical spring 5 may suitably be made slightly conical on the outside, and the spring 8 slightly conical on the inside, with the points of the cones directed in the same direction, namely downwards as indicated in Fig. 1 of the drawing.

The bar 11 is provided on a portion of its length with teeth 13 by means of which it meshes with a toothed wheel 14 on a shaft 15, which is rotatably journalled in the lower portion of the casing 4. To said shaft an arm 16 is secured which transmits motion in the usual manner to the front wheels for steering the same. The teeth of the bar 11 are maintained in no-play engagement with the toothed wheel 14 by means of a roller 17, which is held pressing against the bar by a flat spring 18, one end of which is secured to the casing 4, for instance by means of a rivet 19, and the tension of which may be adjusted by means of a set screw 20. This screw may be secured in adjusted position, if required, for instance by means of a jam nut. When there is wear, which becomes very small owing to the fact that the toothed bar as well as the toothed wheel may be hardened and polished, in contradistinction to the parts of the usual worm gearing, the toothed bar is forced by the spring-loaded roller 17 against the toothed wheel, so that in this manner play is prevented from arising.

The embodiment above described and illustrated in the drawing, and which is constructed in such manner that it may easily be mounted on an ordinary motor car and take the place of the steering gear of the same, is only to be regarded as an example and may of course be modified in several ways in respect of its details without departing from the principle of the invention. Thus, for instance, the hand wheel shaft 2 may instead be connected to the screw 8, and the toothed bar 11, 13 to the nut 5.

I claim:

1. In a steering gear for motor cars, tractors, and the like, a screw gearing comprising a nut and a screw engaging said nut, at least one of said two parts consisting of a helical spring the tension of which prevents lost motion between said two parts.

2. In a steering gear for motor cars, tractors, and the like, a screw gearing comprising a nut and a screw engaging said nut, said nut and said screw consisting of helical springs the tension of which prevents lost motion between said two parts.

3. In a steering gear for motor cars, tractors, and the like, a screw gearing comprising a nut and a screw, said nut and said screw consisting of helical springs, and balls placed between said nut and said screw so as to effect engagement between the same.

4. In a steering gear for motor cars, tractors, and the like, a screw gearing comprising a nut and a screw, said nut and said screw consisting of helical springs, balls placed between said nut and said screw so as to effect engagement between the same, and a ball retainer placed between said nut and said screw for guiding said balls.

5. In a steering gear for motor cars, tractors, and the like, the combination of a screw gearing comprising a nut and a screw engaging said nut, at least one of said two parts consisting of a helical spring the tension of which prevents lost motion between said two parts, a toothed wheel, a toothed rack meshing with said toothed wheel and connected with said screw, and a spring-actuated roller maintaining said toothed rack in engagement with said toothed wheel.

6. In a steering gear for motor cars, tractors, and the like, the combination of a screw gearing comprising a nut and a screw engaging said nut, said nut and said screw consisting of helical springs the tension of which prevents lost motion between said two parts, a toothed wheel, a toothed rack meshing with said toothed wheel and connected with said screw, and a spring actuated roller maintaining said toothed rack in engagement with said toothed wheel.

OTTO GOTTFRIED WELLTON.